G. F. Burkhardt,
Faucet.
No. 44,596.     Patented Oct. 11, 1864.
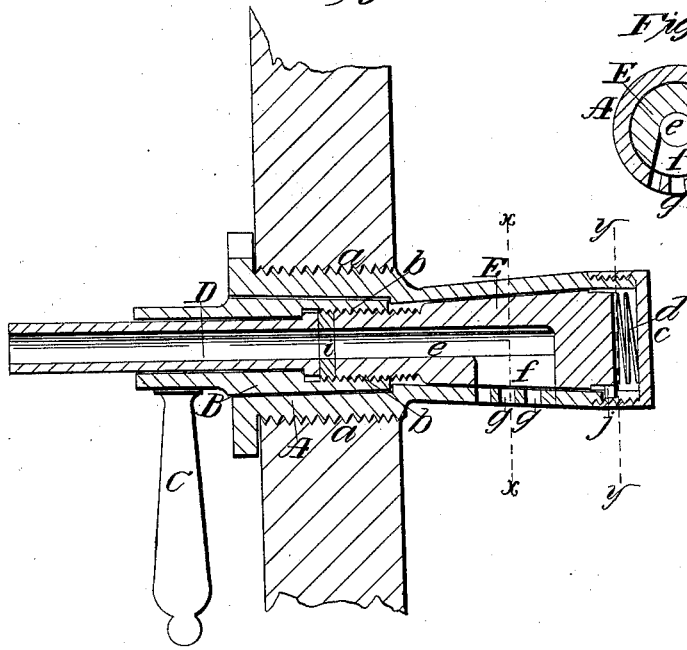
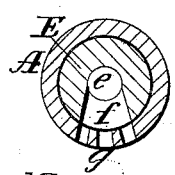
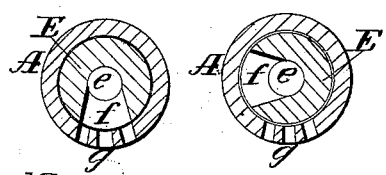
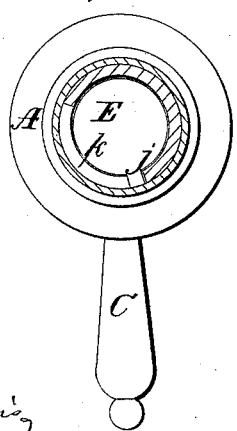
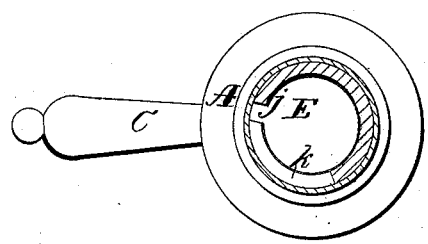
Witnesses:
Jno Coombs
Henry Morris
Inventor:
G. F. Burkhardt.
By Munn & Co

UNITED STATES PATENT OFFICE.

GOTTLIEB F. BURKHARDT, OF ROXBURY, MASSACHUSETTS.

IMPROVEMENT IN FAUCETS.

Specification forming part of Letters Patent No. 44,596, dated October 11, 1864.

*To all whom it may concern:*

Be it known that I, G. F. BURKHARDT, of Roxbury, in the county of Norfolk and State of Massachusetts, have invented a new and Improved Faucet; and I do hereby declare that the following is a full, clear, and exact description thereof, which will enable others skilled in the art to make and use the same, reference being had to the accompanying drawings, forming part of this specification, in which—

Figure 1 represents a longitudinal central section of my invention. Figs. 2 and 3 are transverse sections of the same, showing the parts in different positions, the plane of section being indicated by the line $x\,x$, Fig. 1. Figs. 4 and 5 are similar sections of the same, taken in the plane indicated by the line $y\,y$, Fig. 1.

Similar letters of reference in all the figures indicate corresponding parts.

The object of this invention is a faucet which can be fastened to or unfastened from the head of a barrel or cask without straining said head by blows, and which will be closed when the faucet is removed, so as to prevent the cask or barrel from getting musty.

The nature of my invention and its peculiar advantages will be readily understood from the following description:

By the present mode of tapping beer or ale casks a soft wood plug is driven by the brass faucet through the tap-hole into the casks, and a comparatively powerful final blow is required to effect this operation satisfactorily without losing part of the contents, as the pressure within is considerable, especially if the beer or ale be in good condition. When the faucet is to be withdrawn, it is frequently found so firmly fixed as to require some blows to start it. By these blows the head of the cask is liable to be split or injured so that it has to be repaired before it is again fit for use; and, furthermore, the tap-hole remains open, and if the cask in this state lies about for some months it is liable to become musty, and it can only be again made fit for use by extra labor and expense.

To overcome these two principal disadvantages of the system of tapping casks or barrels now in use was the leading idea in working out the new arrangement, and, besides securing this, some other desirable results are gained, which, though of minor importance, will be readily appreciated by every practical brewer.

My faucet consists of a socket-tube, A, provided on its outer cylindrical surface with a screw-thread, $a$, to screw into the head of a barrel or cask, and bored out on its inside to receive the sleeve B, to which the handle C is secured. The sleeve B passes loosely over the tube D, and its inner end is provided with a screw-thread, $b$, to screw over the end of the plug E. This plug is fitted into the inner portion of the tubular socket A, which is provided with a screw-cup, $c$, and spring $d$ to prevent said plug from getting loose spontaneously in case the faucet or tube D should be removed.

The plug E is perforated with a longitudinal channel, $e$, terminating at its inner end in the lateral hole $f$, and the socket-tube A is provided on its inner portion with apertures $g$, which can be made to register with the hole $f$ by turning the plug. The longitudinal channel $e$ of the plug is in line with the bore of the tube D, and said tube is provided with a flange, $h$, which bears against a shoulder in the inside of the sleeve B. The joint between the inner part of the tube and the outer part or edge of the plug is made tight by a packing-ring or gasket, $i$, of leather or other suitable material, and in order to insure a correct position of the plug either way a pin, $j$, is inserted in its circumference near its inner end, which moves in a recess, $k$, in the inner edge of the tube A, so that the motion of the plug is limited, and it is allowed to be moved in one direction just far enough to make the hole $f$ register with the apertures $g$, thereby opening the faucet, and in the other direction just far enough to close the same.

The operation of this faucet is very simple. The socket-tube A with the plug is left in the barrel in such a position that the tap-hole is closed. By introducing the sleeve B with the faucet or tube D the outer edge of the plug is drawn up tight against the inner part of the tube, and as soon as the sleeve has been screwed on sufficiently tight the plug can be turned in either direction, and the faucet can be opened or closed at pleasure.

The screw-thread on the outer end of the plug must be so arranged that in unscrewing the sleeve the plug is compelled to assume that position in which the hole $f$ does not register with the apertures *g*, and consequently in removing the sleeve with the tube or faucet the tap-hole is closed.

It is obvious that instead of the tube D an ordinary faucet may be inserted into the sleeve B, but in many cases the discharge-tube D will be all that is needed.

What I claim as my invention, and desire to secure by Letters Patent, is—

The sleeve B, with handle C, fitting loosely into the tubular socket A, and operating in combination with the same and with the tube D, or its equivalent, and plug E, substantially in the manner and for the purpose herein shown and described.

GOTTLIEB T. BURKHARDT.

Witnesses:
GEORGE SENNOTT,
HENRY H. RUTTER.